(12) United States Patent
Harata et al.

(10) Patent No.: US 7,189,133 B2
(45) Date of Patent: Mar. 13, 2007

(54) REVERSIBLY METACHROMATIC TOY

(75) Inventors: Hiroki Harata, Nagoya (JP); Kuniyuki Senga, Kasugai (JP); Masanori Takeda, Anjo (JP)

(73) Assignee: The Pilot Ink Co., Ltd., Aichi-ken (JP)

( * ) Notice: Subject to any disclaimer, the term of this patent is extended or adjusted under 35 U.S.C. 154(b) by 22 days.

(21) Appl. No.: 10/790,773

(22) Filed: Mar. 3, 2004

(65) Prior Publication Data

US 2005/0014444 A1 Jan. 20, 2005

(30) Foreign Application Priority Data

Mar. 7, 2003 (JP) .............................. 2003-060999
Jan. 29, 2004 (JP) .............................. 2004-021414

(51) Int. Cl.
*A63H 33/00* (2006.01)

(52) U.S. Cl. ...................... 446/14; 428/304.4; 434/393

(58) Field of Classification Search ................... 446/14, 446/219, 147; 281/2, 3.1, 42, 43, 50; 428/304.4, 428/318.4, 319.3, 319.7, 319.9; 434/393, 434/396

See application file for complete search history.

(56) References Cited

U.S. PATENT DOCUMENTS 4,028,118 A * 6/1977 Nakasuji et al. ......... 106/31.19
4,399,177 A * 8/1983 Ozasa ......................... 428/199
4,554,565 A * 11/1985 Kito et al. ................... 503/201
4,810,562 A * 3/1989 Okawa et al. ............... 428/199
4,917,643 A * 4/1990 Hippely et al. ................ 446/14
5,202,677 A * 4/1993 Parker et al. ................... 349/21
5,219,625 A * 6/1993 Matsunami et al. ........... 428/30
5,928,803 A * 7/1999 Yasuda ........................ 374/101
6,416,853 B1 * 7/2002 Nakashima et al. ...... 428/313.9
6,585,555 B2 * 7/2003 Wong et al. .................. 446/153
6,964,807 B2 * 11/2005 Nakashima et al. ......... 428/199
2002/0052161 A1 * 5/2002 Nakashima et al. ........... 442/86

FOREIGN PATENT DOCUMENTS

| DE | 299 06 251 | | 1/1999 |
|---|---|---|---|
| EP | 0 919 604 | | 6/1999 |
| EP | 1 091 039 | | 4/2001 |
| JP | 47-5619 | | 2/1972 |
| JP | 00475619 | * | 2/1972 |
| JP | 63-43094 | | 11/1988 |
| JP | 06343094 Y2 | * | 11/1988 |
| JP | 00424040 A | * | 1/1992 |
| JP | 8-323049 | | 12/1996 |
| JP | 08323049 A | * | 12/1996 |

* cited by examiner

*Primary Examiner*—Bena Miller
(74) *Attorney, Agent, or Firm*—Fitzpatrick, Cella, Harper & Scinto

(57) ABSTRACT

A reversibly metachromatic toy having a platelike resin foamed substrate, a resin layer provided on both the outer side surfaces of the foamed substrate, and a reversibly metachromatic layer provided on at least one-side resin layer partly or all over the surface.

7 Claims, 8 Drawing Sheets

REVERSIBLY METACHROMATIC TOY

This application claims the benefit of Japanese Patent Applications No. 2003-060999 and No. 2004-021414, which are hereby incorporated by reference.

BACKGROUND OF THE INVENTION

1. Field of the Invention

This invention relates to a reversibly metachromatic toy. More particularly, it relates to a reversibly metachromatic toy having flexibility, free of fear for break or deformation, and happily and safely playable for infants.

2. Related Background Art

Some proposals have been disclosed in respect of picture books and toys having a thermochromic effect (see, e.g., Japanese Utility Model Publications No. 47-5619 and 63-43094 and Japanese Patent Application Laid-Open No. 8-323049).

However, in the picture book disclosed in Japanese Utility Model Publication No. 47-5619, polypropylene resin is used as a support or substrate, which has a high hardness and tends to break because of deterioration. Hence, such a picture book has had a low safety as a picture book for use in baths by infants. In the picture book disclosed in Japanese Utility Model Publication No. 63-43094, a urethane foam covered with soft plastic film is used as a support, which therefore has flexibility, but is poor in durability, and has had a possibility that it breaks as a result of its long-term use or its contact with projections to come wet inside the film.

In the toy disclosed in Japanese Patent Application Laid-Open No. 8-323049, a thin platelike support is used in which a plastic sheet is laminated to the surface of a foamed material, which therefore has flexibility, but the support may warp with time because the plastic sheet is laminated to only one side of the support.

SUMMARY OF THE INVENTION

The present invention is to solve the above problems. Accordingly, an object of the present invention is to provide a reversibly metachromatic toy having flexibility, free of fear for break or deformation due to long-term use, and happily and safely playable for infants in virtue of a reversibly metachromatic effect.

The present invention provides a reversibly metachromatic toy comprising a platelike resin foamed substrate, resin layers provided respectively on both the outer surfaces of the foamed substrate, and a reversibly metachromatic layer provided on at least one of the resin layers partly or all over the surface.

The reversibly metachromatic toy obtained, according to the present invention, is superior in flexibility, free of fear for break or deformation due to long-term use, and happily and safely playable for infants.

According to a first preferable aspect of the present invention, the reversibly metachromatic toy may comprise any one of a reversibly thermochromic layer, a reversibly photochromic layer and a reversibly water-metachromatic layer, or a combination of any two or all of these. The term "water metachromatic toy or layer" in the present application is used to mean a toy or layer which, upon absorption of water, becomes transparent or translucent and develops color tone of the underlining layer, and the term "water metachromatic" is used in this sense.

The reversibly metachromatic toy of the first preferable aspect of the present invention can readily impart a metachromatic effect by heating or cooling, by irradiation with light, by adhesion of a liquid, and so forth.

A second preferable aspect of the present invention provides a reversibly metachromatic toy set comprise a plurality of the reversibly metachromatic toys formed with one hole or a plurality of holes, and a fastener or fasteners made to pass through the hole or holes to hold the plural reversibly metachromatic toys as a toy set.

The reversibly metachromatic toy set makes it possible to form a picture book using the reversibly metachromatic toys or to assemble and safe keep a plurality of reversibly metachromatic toys, and hence the toys can be prevented from being lost or can be kept back without bulking.

DESCRIPTION OF THE PREFERRED EMBODIMENTS

Figure 1:
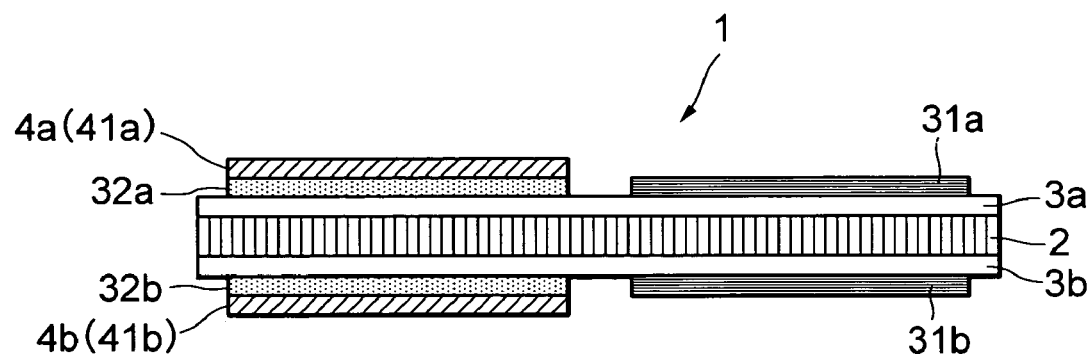
FIG. 1 is a cross-sectional view in an example of the reversibly metachromatic toy of the present invention.

A reversibly metachromatic toy of the present invention has a platelike resin foamed substrate, resin layers provided respectively both the outside surfaces of the foamed substrate, and a reversibly metachromatic layer provided on either or both of the resin layers partly or entirely.

The resin layer is a layer superposed on the platelike resin foamed substrate on each side thereof. It is provided on each side of the platelike resin foamed substrate by printing or coating a transparent resin or colored resin, by printing or coating an ink containing a transparent resin or colored resin, by sticking a film formed of a transparent resin or colored resin, or by transferring a transparent resin or colored resin layer from a transfer sheet or film.

In addition, patterns and characters or letters may be printed using the above ink on or in the resin letters may be printed on the above film, figures or patterns and characters or letters may be transferred from a transfer sheet. This can enhance the utility required as toys.

The resin layers may preferably be provided over a 50% or more area of each surface area of the platelike resin foamed substrate. The resin layers may be provided at mutually opposite positions on both of the top surface and the back surface so that the foamed substrate can more effectively be prevented from its deformation such as warpage.

As the resin used in the resin layer, those for general purposes may be used. Those having a small rate of heat shrinkage may preferably be used, and it is preferable that the one provided on the top surface of the platelike resin foamed substrate and the one provided on the back surface of the same have substantially equal rates of heat shrinkage.

The resin used for the resin layer may specifically include synthetic resins such as ionomer resins, an isobutylene-maleic anhydride copolymer resin, an acrylonitrile-acrylic styrene copolymer resin, an acrylonitrile-styrene copolymer resin, an acrylonitrile-butadiene-styrene copolymer resin, an acrylonitrile-chlorinated polyethylene-styrene copolymer resin, an ethylene-vinyl chloride copolymer resin, an ethylene-vinyl acetate copolymer resin, an ethylene-vinyl acetate-vinyl chloride grafted copolymer resin, vinyl acetate resin, vinyl chloride resin, vinylidene chloride resin, chlorinated vinyl chloride resin, a vinyl chloride-vinylidene chloride copolymer resin, chlorinated polyethylene resins, chlorinated polypropylene resin, polyamide resins, polycarbonate resins, polybutadiene, polyethylene terephthalate resin, polybutylene terephthalate resin, polystyrene resin, a high-impact polystyrene resin, a styrene-maleic acid copolymer resin, an acrylate-styrene copolymer resin, polypropylene resins, polymethylstyrene resin, acrylate resins, polymethyl methacrylate resins, epoxy acrylate resins, alkylphenol resins, rosin-modified phenol resins, rosin-modified alkyd resins, phenol rosin-modified alkyd resins, styrene rosin-modified alkyd resins, epoxy rosin-modified alkyd resins, acryl-modified alkyd resins, amino alkyd resins, polyvinyl butyral resins, polyurethane resins, a vinyl chloride-vinyl acetate copolymer resin, epoxy resins, alkyd resins, a styrene-butadiene copolymer resin, a styrene-butadiene-styrene copolymer resin, a styrene-ethylene-butylene-styrene copolymer resin, unsaturated polyester resins, saturated polyester resins, a vinyl chloride-acrylate copolymer resin, polyisobutylene, butyl rubber, cyclic rubbers, chlorinated rubbers, polyvinyl alkyl ethers, fluorine resins, silicone resins, phenol resins, petroleum type hydrocarbon resins, ketone resins, toluene resins, xylene resins, melamine resins, urea resins, benzoguanamine resins, polyethylene oxide, polyvinyl pyrrolidone, a vinylpyrrolidone-vinyl acetate copolymer resin, polyvinyl alcohol, modified polyvinyl alcohols, polyacrylic salts, polymethacrylic salts, acrylate type copolymer emulsions, methacrylate type copolymer emulsions, a vinyl-acetate-acrylate copolymer emulsion, an ethylene-vinyl acetate copolymer emulsion, a styrene-acrylate copolymer emulsion, vinyl chloride type copolymer emulsions, vinylidene chloride type copolymer emulsions, a polyvinyl acetate emulsion, polyolefin type emulsions, rosin ester emulsions, epoxy resins emulsions, polyurethane type emulsions, and synthetic rubber latexes; and synthetic low- or medium-molecular-weight polymers such as low-molecular-weight polyethylene, low-molecular-weight polypropylene, low-molecular-weight polystyrene, cumarone plastics, polybutene, phenoxy plastics, liquid polybutadiene, liquid rubbers, petroleum type hydrocarbon resins, and cyclopenadiene type petroleum resins.

The figures or patterns and characters or letters formed on or in the resin layer may be formed using dyes or pigments for general purposes. Besides, reversibly thermochromic pigments, reversibly photochromic pigments or the like may also be used.

The platelike resin foamed substrate may include molded members having closed cells and being made of synthetic resins such as polyolefin resins, polyurethane resins and styrol resins. A single-sheet platelike substrate or a laminate of two-sheet platelike substrates may be used. Also preferably used as the platelike resin foamed substrates are those having been expanded by 5 to 40 times, and more preferably 10 to 35 times. Those having been expanded by more than 40 times are too soft and weak to afford a sufficient strength required as toys. Those having been expanded by less than 5 times have so high a hardness as to lack in flexibility and elastic feeling.

As the reversibly metachromatic layer, any one of a reversibly thermochromic layer, a reversibly photochromic layer and a reversibly water-metachromatic layer, or a combination of any two or all of these may be superposed on at least one-side resin layer partly or all over the surface. This can provide reversible metachromatism caused by heat, light or liquid, and also hiding effect brought by such metachromatism, whereby the fun or enjoyment as toys can be made higher. In addition, the reversibly metachromatic layer may be formed as an image of characters or letters, figures or patterns, marks and so forth, whereby the design properties as toys can be more improved. Any two or all of the reversibly thermochromic layer, the reversibly photochromic layer and the reversibly water-metachromatic layer may also be used in combination as the reversibly metachromatic layers. This can also provide phase changes using various color-changing means in a single toy.

As the reversibly metachromatic layer, the reversibly thermochromic layer contains in the layer a reversibly thermochromic composition. Preferably usable as this composition is a reversibly thermochromic composition containing three components which are an electron-donating color-developing organic compound, an electron-accepting compound and a reaction medium capable of causing color-developing reaction to take place reversibly. Specifically, for such a reversibly thermochromic composition, reversibly thermochromic compositions disclosed in U.S. Pat. No. 4,028,118 and U.S. Pat. No. 4,732,810 and U.S. Pat. No. 5,558,700 may be listed.

As the reversibly thermochromic compositions, there are also listed, highly sensitive reversibly thermochromic compositions proposed by the assignee of the present application, having a hysteresis width of 3° C. or less with regard to the color density-temperature curve according to temperature changes, as disclosed in U.S. Pat. No. 4,732,810.

The above compositions change in color at about a given temperature (color-changing point) making a border, and in the normal temperature region can only exist in any one specific state of both states before and after their color change. More specifically, these are of a type that shows what is called a small hysteresis width (ΔH) on temperature/color density due to changes in temperature to cause metachromatism, in which the other state is maintained so long as the heat or cold that is required for them to come into that state is applied, but returns to the state shown in the normal temperature region once the heat or cold comes not applied.

Also effective are those disclosed in U.S. Pat. No. 4,720, 301, which have been proposed by the assignee of the present application, and are temperature-sensitive thermochromic color memorizable compositions that show great hysteresis characteristics to cause metachromatism, i.e., metachromatic materials of a type capable of changing in color following courses which are greatly different in shape of curves formed by plotting changes in coloring density due to changes in temperature, between a case where the temperature is raised from the side of a temperature lower than a color-changing temperature region and a case where inversely the temperature is dropped from the side of a temperature higher than the color-changing temperature region, and having a characteristic feature of capable of memorizing a state changed at a low-temperature side color-changing point or below or at a high-temperature side color-changing point or above, in the normal temperature region between the low-temperature side color-changing point and the high-temperature side color-changing point.

The composition may also include, as heat-color-developing type thermochromic compositions, which are capable of developing a color upon heating from the color-extinguished state, systems in which a specific alkoxyphenolic compound having a straight-chain or side-chain alkyl group having 3 to 18 carbon atoms is used as the electron-accepting compound (U.S. Pat. No. 5,919,432) and systems in which a specific hydroxybenzoic ester is used (Japanese Patent Application Laid-Open No. 2001-105732), which have been proposed by the assignee of the present application. Further applicable are systems in which a gallic ester is used (U.S. Patent Published Application No. 2003-0122113 A1).

The reversibly thermochromic composition described above can be effective even when used as it is, and may preferably be used in the state the composition is enclosed in microcapsules. This is because the reversibly thermochromic composition can be kept to have the same composition under various use conditions and can have the same operation and effect.

In the case when it is enclosed in microcapsules, a chemically and physically stable microcapsule pigment can be made up. Practical utility can be satisfied when the microcapsules have a particle diameter ranging from 0.1 μm to 100 μm, and preferably from 3 μm to 30 μm.

Incidentally, the thermochromic material may be formed into such microcapsules by conventionally known methods such as interfacial polymerization, in situ polymerization, cure-in-liquid coating, phase separation from aqueous solution, phase separation from organic solvent, melt-diffusion cooling, air-suspension coating, and spray drying, any of which may appropriately be selected according to uses. Also, when put into practical use, the surfaces of the microcapsules may be endowed with durability according to purposes by further forming secondary resin coatings thereon, or their surface properties may be modified.

As the reversibly metachromatic layer, the reversibly photochromic layer is a layer containing in the layer a photochromic compound capable of reversibly changing in color upon irradiation with ultraviolet rays. General-purpose photochromic compounds may be used.

As the photochromic compound, it may include, e.g., spiropyran compounds, fulqide compounds, dihydropyrene compounds, indigo compounds, aziridine, polycyclic aromatic compounds, azobenzene compounds, salicylideneaniline compounds, xanthene compounds, spiroxazine compounds, diarylethene compounds, naphthopyran compounds, and naphthoxadine compounds.

The photochromic compound may also be used in the state it is enclosed in the microcapsules described previously.

The reversibly metachromatic layer may be formed by any conventionally known method, using an ink or coating material prepared by dispersing in a vehicle the reversibly thermochromic composition, the photochromic compound or the microcapsule pigment having enclosed any of these.

A general-purpose dye, pigment or lustrous pigment may further be used in the state it is dispersed in an ink or coating material together with the reversibly thermochromic composition, the photochromic compound or the microcapsule pigment having enclosed any of these.

As the lustrous pigment, usable are metalescent pigments such as natural mica, synthetic mica, glass particles and alumina particles surface-coated with an oxide of a metal such as titanium, zirconium, chromium, vanadium or iron, and cholesteric liquid crystal type lustrous pigments.

If necessary, on the surface of the reversibly metachromatic layer which is either reversibly thermochromic layer or reversibly photochromic layer, a luster layer containing the lustrous pigment may be provided for the purposes of improving hiding performance and imparting lustrousness, or a top coat layer formed of a transparent resin, a color transparent resin or the like may be provided for the purpose of preventing peeling or marring due to long-term use or scratching. In the luster layer or top coat layer used for the reversibly thermochromic layer, additives such as an ultraviolet absorber and an antioxidant may further appropriately be mixed for the purpose of imparting light fastness.

As a lower layer at the part on which the reversibly metachromatic layer is formed, an under coat layer formed of a transparent resin, a color transparent resin or the like may be formed for the purpose of improving adherence between the reversibly metachromatic layer and the resin layer.

As the reversibly water-metachromatic layer in the reversibly metachromatic layer, a porous layer may preferably be used which is formed of a binder resin to which a low-refractive-index pigment stands fixed dispersedly, and is opaque in a water-unabsorbed state and capable of turning transparent in a water-absorbed state.

The low-refractive-index pigment may include fine-particle silicic acid, baryte powder, precipitated barium sulfate, barium carbonate, precipitated calcium carbonate, gypsum, clay, talc, alumina white and basic magnesium carbonates, any of which may be used alone or in combination of two or more. These pigments have a refractive index in the range of from 1.4 to 1.7 and exhibit good transparency upon absorption of water or the like.

There are no particular limitations on the particle diameter of the low-refractive-index pigment. Those having particle diameters of from 0.03 μm to 10.0 μm may preferably be used. Of the above low-refractive-index pigments, fine-particle silicic acid may preferably be used.

The fine-particle silicic acid is produced as non-crystalline, amorphous silicic acid. According to its production process, it is roughly grouped into a dry-process product obtained by gaseous-phase reaction such as thermal decomposition of a silicon halide such as silicon tetrachloride (hereinafter "dry-process fine-particle silicic acid") and a wet-process fine-particle silicic acid obtained by liquid-phase reaction such as decomposition of sodium silicate with an acid (hereinafter "wet-process fine-particle silicic acid"). Either may be used, but the wet-process fine-particle silicic acid is more preferably used because, when it is used, it has a higher hiding performance in a normal condition than the system of dry-process fine-particle silicic acid and hence the binder resin can be mixed in a larger proportion to the fine-particle silicic acid to enable improvement in film strength of the porous resin layer itself.

As the fine-particle silicic acid used to satisfy the hiding performance of the porous resin layer in a normal condition as stated above, the wet-process fine-particle silicic acid is preferred. This is because the dry-process fine-particle silicic acid and the wet-process fine-particle silicic acid differ in structure from each other. The dry-process fine-particle silicic acid forms a three-dimensional structure in which silicic acid stands combined closely. On the other hand, the wet-process fine-particle silicic acid has what is called two-dimensional structure moiety in which silicic acid is condensed to form a long molecular arrangement.

Thus, the wet-process fine-particle silicic acid has a coarser molecular structure than the dry-process fine-particle silicic acid. Hence, when used in the porous resin layer, the wet-process fine-particle silicic acid can provide superior irregular or diffused light reflection properties in a dried state compared with a system making use of the dry-process fine-particle silicic acid, thus bringing a great hiding performance in a normal condition, as so presumed.

The medium chiefly absorbed in the porous resin layer is water. Accordingly, as the low-refractive-index pigment contained therein, the wet-process fine-particle silicic acid has more hydroxyl groups present on particle surface as silanol groups than the dry-process fine-particle silicic acid, and hence is preferably used because it has an appropriate hydrophilicity.

In the case when the wet-process fine-particle silicic acid is used as the low-refractive-index pigment, in order to satisfy both the hiding performance in normal condition and the transparency in liquid-absorbed condition, it may preferably be in a coating weight of from 1 $g/m^2$ to 30 $g/m^2$, and more preferably from 5 $g/m^2$ to 20 $g/m^2$, which may depend on the type of the wet-process fine-particle silicic acid and its properties such as particle diameter, specific surface area and oil absorption. If it is less than 1 $g/m^2$, it is difficult to obtain a sufficient hiding performance in normal condition. If on the other hand it is more than 30 $g/m^2$, it is difficult to obtain a sufficient transparency in liquid-absorbed condition.

The low-refractive-index pigment is dispersed in a vehicle containing a binder resin as a binding agent, to make up a dispersion ink, which is then applied over the surface of the resin layer by a means such as printing, coating or spraying to form the porous layer (reversibly water-metachromatic layer).

In the binder resin, a cross-linkable one may be cross-linked by addition of any desired cross-linking agent, whereby the film strength can be more improved.

In the binder resin, there are one having a high affinity for water and one having a low affinity therefor. These may be used in combination. This enables regulation of the time of permeation, the degree of permeation and the rate of drying after permeation, into the porous layer. A dispersant may further appropriately be added so that the above regulation can be controlled.

The binder resin may include urethane resins, nylon resins, viny acetate resins, acrylate resins, acrylate copolymer resins, acrylic polyol resins, vinyl chloride-vinyl acetate copolymer resins, maleic acid resins, polyester resins, styrene resins, styrene copolymer resins, polyethylene resins, polycarbonate resins, epoxy resins, styrene-butadiene copolymer resins, acrylonitrile-butadiene copolymer resins, methyl methacrylate-butadiene copolymer resins, butadiene resins, chloroprene resins, melamine resins, and emulsions of these resins, as well as casein, starch, cellulose derivatives, polyvinyl alcohol, urea resins, and phenolic resins.

The fine-particle silicic acid and any of these binder resins may be mixed in a proportion of from 0.5 part by weight to 2 parts by weight, and more preferably from 0.8 part by weight to 1.5 parts by weight, as binder resin solid content based on 1 part by weight of the fine-particle silicic acid, which proportion depends on the type and properties of the fine-particle silicic acid. If the binder resin solid content based on 1 part by weight of the fine-particle silicic acid is less than 0.5 part by weight, it is difficult to achieve the practical film strength of the porous layer. If it is more than 2 parts by weight, the permeability of water into the porous layer may come poor.

The porous layer (reversibly water-metachromatic layer) has a smaller mixing proportion of the binder resin to a colorant than that in conventionally known commonly available coating films, and hence may attain a sufficient film strength with difficulty. Accordingly, in order to enhance scratch-resistant strength, it is effective to use, among the above binder resins, nylon resins or urethane resins.

The urethane resins include polyester type urethane resins, polycarbonate type urethane resins and polyether type urethane resins. Two or more types of these may be used in combination. Also usable are urethane type emulsion resins prepared by emulsifying and dispersing any of the above resins in water, and colloidal dispersion type (ionomer type) urethane resins dissolved or dispersed in water by self-emulsification without requiring any emulsifier on account of ionic groups of urethane resin itself (urethane ionomer) having ionic properties.

Incidentally, as the above urethane type resins, either of water-soluble urethane resins and oil-soluble urethane resins may be used. Preferably usable in the present invention are water-soluble urethane resins, in particular, urethane type emulsion resins and colloidal dispersion type urethane resins.

The urethane resins may be used alone or in combination. Other binder resins may also be used in combination, in accordance with the type of laminating materials or the performance required in films. In the case when a binder resin other than the urethane resin is used, the urethane resin may preferably be incorporated in the binder resin of the porous resin layer in an amount of 30% or more as weight ratio of solid content, in order to attain practical film strength.

A water-repellent resin layer may further be used in combination with the porous layer (reversibly water-metachromatic layer). The water-repellent resin layer is formed by applying onto the porous resin layer a water-repelling solution containing a water-repellent resin, to make the latter adhere to the former and penetrate thereinto so as to form an image in an appropriate form, followed by drying. Thus, the water-repellent resin layer is so provided as to exists partly inside the porous resin layer in a co-existent state. Hence, in the porous layer at its part where the water-repellent resin layer is co-existent, any water-absorbed condition is not formed because of the water-repellent effect, and an opaque condition is retained. Accordingly, the water-repellent resin layer and the porous layer which are distinguishable with difficulty in the normal condition (non-water-absorbed condition) comes distinguishable upon absorption of water into the porous layer at its part where no water-repellent resin layer is provided.

The water-repellent resin may be selected from water-repellent resins of a silicone type, a paraffin type, a polyethylene type, an alkylethylene urea type and a fluorine type.

Of the above water-repellent resins, fluorine type water-repellents are effective in view of water-repellent effect and working suitability, and may effectively be applied in a coverage ranging from 1 g/m² to 50 g/m², and preferably from 2 g/m² to 30 g/m², as solid content.

A general-purpose dye, pigment, lustrous pigment or reversibly thermochromic pigment may also be added when the porous layer and the water-repellent resin layer are formed.

One hole or a plurality of holes may be provided in the reversibly metachromatic toy, and a fastener such as a string or a ring may be made to pass through the hole(s) to hold a plurality of the reversibly metachromatic toys in the form of a booklet so as to be used as a picture book, or an openable and closable fastener may be used so that a plurality of reversibly metachromatic toys can be assembled and kept safe with ease. In addition, since the reversibly metachromatic toy is the one provided with the resin layers on both sides of the platelike resin foamed substrate, respective pages in the case when the toys are formed into a booklet or individual toys held with the fastener do not warp or deform even when stored in the state they are piled. Hence, the toys can be kept safe compactly without bulking, and also can not be defaced.

When the reversibly metachromatic toys are formed into a booklet, besides the above method of holding, any general-purpose methods may also be used, as exemplified by male-female engagement, binding with clips, heat fusing, and bonding.

In addition, as the reversibly metachromatic toy of the present invention, besides its practical use in the shape of a sheet or a booklet, it may be used in its construction in the shape of a puzzle or a block.

EXAMPLES

The present invention is described below in greater detail by giving Examples. In the following, "part(s)" in Examples refers to "part(s) by weight".

Example 1 (See FIG. 1)

On both sides of a 140 mm long, 140 mm wide and 6 mm thick platelike foamed substrate 2 made of an ethylene-vinyl acetate copolymer resin, solid patterns were formed all over the surfaces by screen printing using a non-metachromatic white ink containing a polyurethane resin, to form resin layers 3a and 3b. Thereafter, on the white-ink resin layers 3a and 3b, letters 32a and 32b of "mouse" and "zebra", respectively, and their figures or patterns 31a and 31b were each provided by screen printing using a non-metachromatic ink (non-metachromatic inks used to form background layers and/or letters and/or figures (or patterns) may be the same-color ink or different-color inks; the same applies in the following Examples).

On or over the letters 32a and 32b of "mouse" and "zebra", as respectively, reversibly metachromatic layers 4a and 4b, reversibly thermochromic layers 41a and 41b forming circular solid patterns were provided by screen printing using a reversibly thermochromic ink prepared by dispersing in a urethane resin a reversibly thermochromic microcapsule pigment of 8 μm in average particle diameter which was obtained by encapsulizing (enclosing in microcapsules) a thermochromic composition made up of a mutual solution of 1.5 parts of 3-(4-diethylamino-2-ethoxyphenyl)-3-(1-ethyl-2-methyl indol-3-yl)-4-azaphthalide, 6 parts of 4,4'-(2-methyl-propylidene)bisphenol and 25 parts each of cetyl alcohol and stearyl laurate, by epoxy resin/amine curing agent interfacial polymerization. Thus, a reversibly thermochromic toy 1 was obtained.

In the above reversibly thermochromic toy 1, the non-metachromatic patterns 31a and 31b "mouse" and "zebra" provided on the resin layers 3a and 3b, respectively, and blue circular solid patterns of the reversibly thermochromic layers 41a and 41b were each viewable at room temperature. Upon heating to 38° C. or more with hot water or the like, the blue circular solid patterns came color-extinguished to turn colorless, so that the letters 32a and 32b of "mouse" and "zebra" on the resin layers 3a and 3b came viewable. The reversibly thermochromic layers 41a and 41b further came to again color as their temperature came to be 35° C. or less upon leaving at room temperature or upon cooling, so that the circular solid patterns came viewable and the letters 32a and 32b were hidden. These phase changes were repeatedly performable.

The reversibly thermochromic toy 1 was also free of any warpage or deformation of the foamed substrate 2, was rich in flexibility, and maintained the hand and feel peculiar to the foamed substrate, because the resin layers 3a and 3b were directly provided on both the top surface and back surface, respectively, of the foamed substrate 2 by screen printing.

Figure 2:
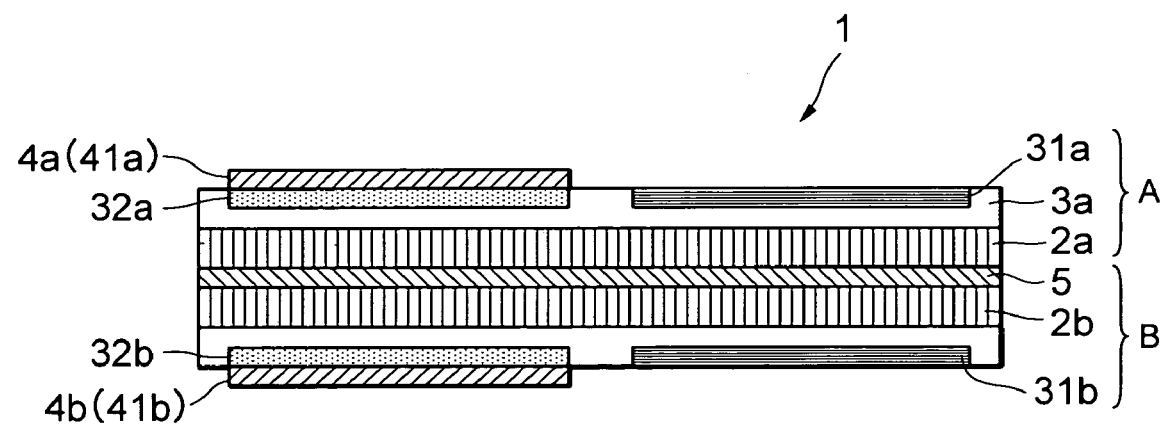
FIG. 2 is a cross-sectional view in another example of the reversibly metachromatic toy of the present invention.

Example 2 (See FIG. 2)

To the top surface of a 140 mm long, 140 mm wide and 3 mm thick platelike foamed substrate 2a made of an ethylene-vinyl acetate copolymer resin, a resin layer 3a comprising a background-making white layer provided with letters 32a of "duck" and a pattern 31a of "duck" by the use of a polyurethane resin-containing non-metachromatic ink each was thermally transferred from a transfer sheet. Thereafter, as a reversibly metachromatic layer 4a, a reversibly thermochromic layer 41a forming a circular solid pattern was provided on or over the letters 32a of "duck" by screen printing using the same reversibly thermochromic ink as that of Example 1. Thus, a reversibly thermochromic foamed substrate structure A was obtained.

Next, to the top surface of a likewise 140 mm long, 140 mm wide and 3 mm thick platelike foamed substrate 2b made of an ethylene-vinyl acetate copolymer resin, a resin layer 3b comprising background-making green layer provided with letters 32b of "raccoon dog" and a figure or pattern 31b of "raccoon dog" by the use of a polyurethane resin-containing non-metachromatic ink each was thermally transferred from a transfer sheet. Thereafter, as a reversibly metachromatic layer 4b a reversibly thermochromic layer 41b forming a circular solid pattern was provided on or over the letters 32b of "raccoon dog" by screen printing using the same reversibly thermochromic ink as that of Example 1. Thus, a reversibly thermochromic foamed substrate structure B was obtained.

Further, the reversibly thermochromic foamed substrate structure A was coated on the back surface thereof with an adhesive 5, which was then laminated to the back surface of the reversibly thermochromic foamed substrate structure B to obtain a reversibly thermochromic toy 1.

In the above reversibly thermochromic toy 1, on the substrate structure A side, the non-metachromatic pattern 31a "duck" provided in the resin layer 3a and a blue circular solid pattern of the reversibly thermochromic layer 41a and, on the substrate structure B side, the non-metachromatic pattern 31b "raccoon dog" provided in the resin layer 3b and the blue circular solid pattern of the reversibly thermochromic layer 41b were each viewable at room temperature. Upon heating to 38° C. or more with hot water or the like, the blue circular solid patterns came color-extinguished to turn colorless, so that, on the substrate structure A side, the letters 32a of "duck" in the resin layer 3a and, on the substrate structure B side, the letters 32b of "raccoon dog" in the resin layer 3b each came viewable. The reversibly thermochromic layers 41a and 41b further came to again color as their temperature came to be 35° C. or less upon leaving at room temperature or upon cooling, so that the blue circular solid patterns came viewable and the letters 32a and 32b were hidden. These phase changes were repeatedly performable.

The reversibly thermochromic toy 1 was also free of any warpage or deformation of the foamed substrates 2a and 2b, was rich in flexibility, and maintained the hand and feel peculiar to the foamed substrates, because the resin layers 3a and 3b were provided, respectively, on both the outer surfaces of the foamed substrates 2a and 2b by transfer processing.

Figure 3:
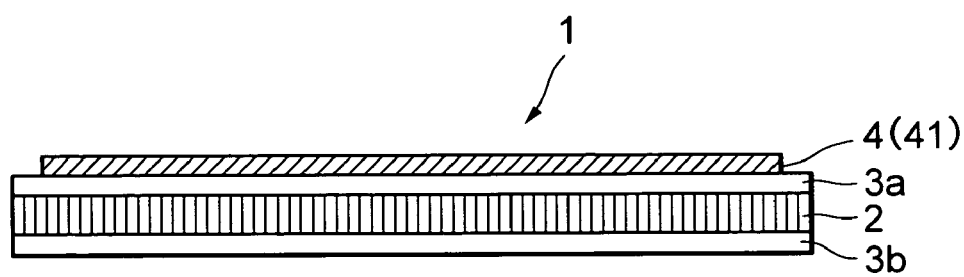
FIG. 3 is a cross-sectional view in still another example of the reversibly metachromatic toy of the present invention.

Example 3 (See FIG. 3)

On both the top surface and back surface of a 300 mm long, 400 mm wide and 5 mm thick platelike foamed substrate 2 made of an ethylene-vinyl acetate copolymer resin, resin layers 3a and 3b containing a transparent urethane resin were formed all over the surfaces by coating. Thereafter, on the resin layer 3a on the top surface of the foamed substrate 2, as a reversibly metachromatic layer 4 a reversibly thermochromic layer 41 was provided by forming a figure or pattern of "octopus" by screen printing using a reversibly thermochromic ink (black←→red) prepared by adding a non-thermochromic red pigment to the same reversibly thermochromic ink prepared in Example 1. Thus, a reversibly thermochromic toy was obtained.

In the above reversibly thermochromic toy 1, the reversibly thermochromic layer 41 was viewable as the figure or pattern of "octopus" at room temperature. Upon heating to 38° C. or more with hot water or the like, the figure or pattern of "octopus" came to change in color to turn red. The reversibly thermochromic layer 41 further came to again change in color as its temperature came to be 35° C. or less upon leaving at room temperature or upon cooling, so that the pattern of "octopus" came viewable. This phase change was repeatedly performable.

The reversibly thermochromic toy 1 was also free of any warpage or deformation of the foamed substrate 2, was rich in flexibility, and maintained the hand and feel peculiar to the foamed substrate, because the resin layers 3a and 3b were provided on both the top surface and back surface, respectively, of the foamed substrate 2 by coating.

Figure 4:
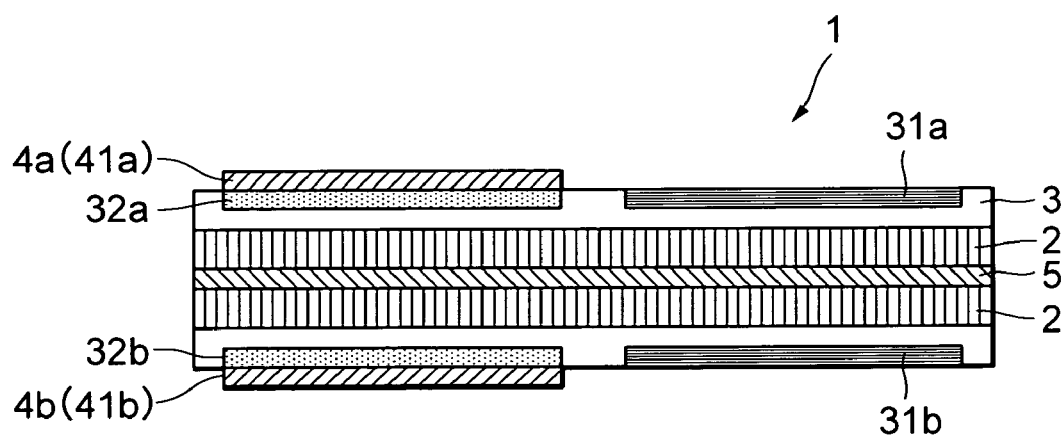
FIG. 4 is a cross-sectional view in a further example of the reversibly metachromatic toy of the present invention.

Example 4 (See FIG. 4)

Onto the top surface of a 160 mm long, 330 mm wide and 3 mm thick platelike foamed substrate 2 made of an ethylene-vinyl acetate copolymer resin, a resin layer 3 which comprises, side by side, i) a background-making green layer provided with letters 32a of "rabbit" and a figure or pattern 31a thereof by the use of a polyurethane resin-containing non-metachromatic ink each and ii) a background-making white layer provided with letters 32b of "fox" and a figure or pattern 31b thereof by the use of a polyurethane resin-containing non-metachromatic ink each were thermally transferred from a transfer sheet. Next, as reversibly metachromatic layers 4a and 4b, reversibly thermochromic layers 41a and 41b were formed by superposing circular solid patterns onto the letters 32a and 32b of "rabbit" and "fox", respectively, by screen printing using the same reversibly thermochromic ink as that of Example 1. Further, the foamed substrates 2 with these layers was coated on the back surface thereof with an adhesive 5, which was then laminated by folding it in such a way that the patterns 31a and 31b "rabbit" and "fox", respectively, which had been provided side by side came top and bottom opposite, followed by cutting in a size of 140 mm in length and 140 mm in width. Thus, a reversibly thermochromic toy 1 was obtained.

Figure 10:
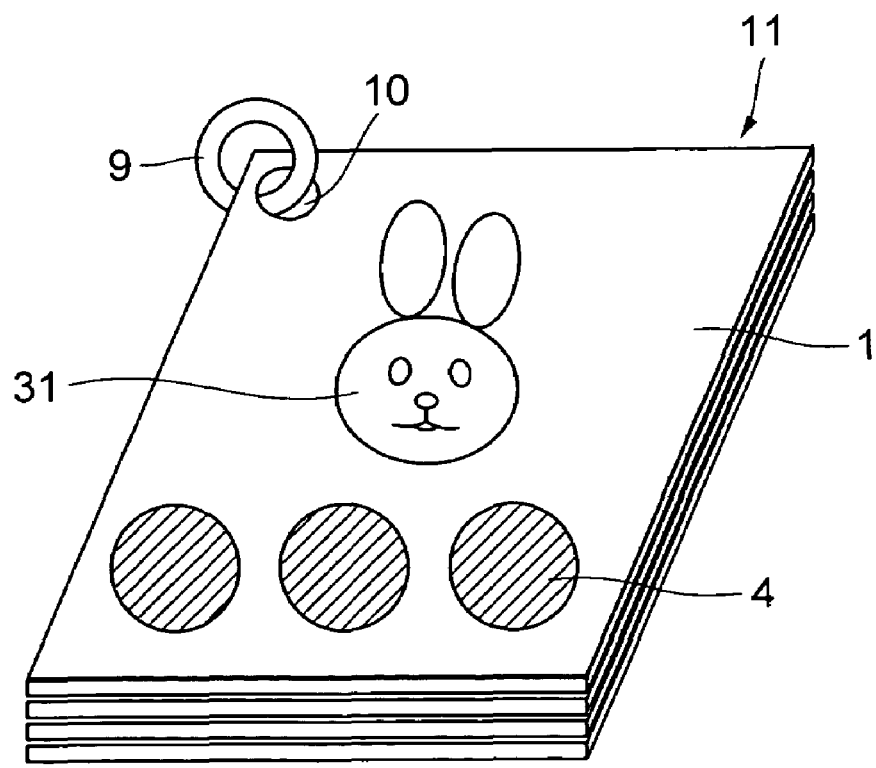
FIG. 10 is a perspective view of the reversibly metachromatic toy of the present invention in the form of a booklet.

Next, setting the reversibly thermochromic toy 1 thus obtained as pages 1 and 2 and the reversibly thermochromic toy 1 obtained in Example 2 as pages 3 and 4, one hole 10 was made as shown in FIG. 10, in the two reversibly thermochromic toys 1 through their left upper end portions, and these toys were put together with a ring fastener 9 made of a resin, to make up a reversibly thermochromic toy set in the form of a picture book, which was put into practical use.

In the above reversibly thermochromic toy set, on pages 1 and 2, the non-metachromatic figures or patterns 31a and 31b "rabbit" and "fox", respectively, provided in the resin layers 3 and blue circular solid patterns of the reversibly thermochromic layers 41a and 41b were each viewable at room temperature. Upon heating to 38° C. or more with hot water or the like, the blue circular solid patterns came color-extinguished to turn colorless, so that the letters 32a and 32b of "rabbit" and "fox", respectively, in the resin layers 3 each came viewable. The reversibly thermochromic layers 41a and 41b further came to again color as their temperature came to be 35° C. or less upon leaving at room temperature or upon cooling, so that the circular solid patterns came viewable and the letters 32a and 32b were hidden. On pages 3 and 4, the toy set showed the same color changes as those in Example 2. These phase changes were repeatedly performable.

The reversibly thermochromic toy set was also free of any warpage or deformation of the foamed substrates 2, was rich in flexibility, and maintained the hand and feel peculiar to the foamed substrate, because the resin layers 3 were provided respectively on both the outer surfaces of the foamed substrates 2, 2 by printing and transfer processing. At the same time, by means of the binding fastener (like 9 in FIG. 10), the reversibly thermochromic toys 1 were holdable in plurality, promising a high fun or enjoyment as toys.

Figure 5:
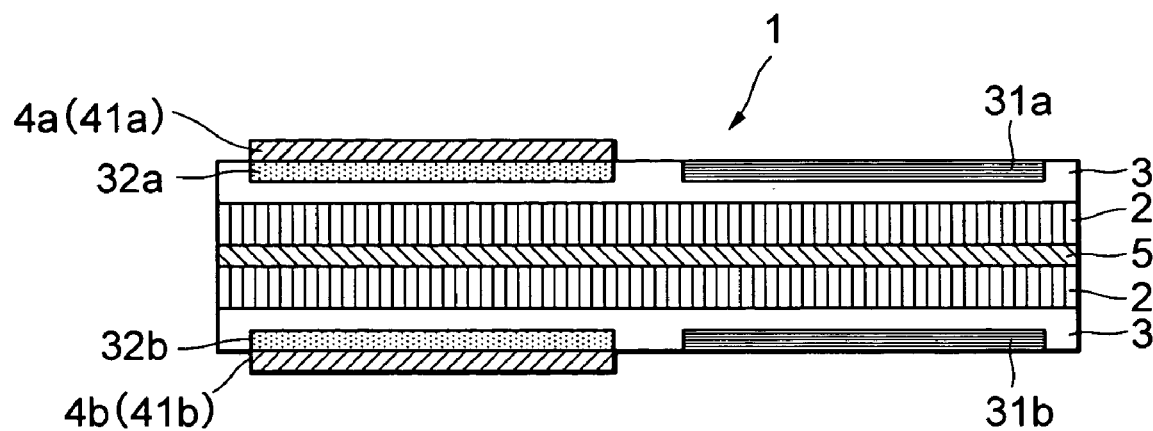
FIG. 5 is a cross-sectional view in a still further example of the reversibly metachromatic toy of the present invention.

Example 5 (See FIG. 5)

Onto the top surface of a 160 mm long, 330 mm wide and 3 mm thick platelike foamed substrate 2 made of an ethylene-vinyl acetate copolymer resin, a resin layer 3 which comprises, side by side i) a background-making white layer provided with letters 32a of "elephant" and a figure or pattern 31a thereof by the use of a polyurethane resin-containing non-metachromatic ink each and ii) a background-making green layer and letters 32b of "giraffe" and a figure or pattern 31b thereof by the use of a polyurethane resin-containing non-metachromatic ink each was thermally transferred from a transfer sheet. Thereafter, as reversibly metachromatic layers 4a and 4b, reversibly thermochromic layers 41a and 41b were formed by superposing circular solid patterns onto or over the letters 32a and 32b of "elephant" and "giraffe", respectively, by screen printing using a reversibly thermochromic ink prepared by dispersing in a urethane resin a reversibly thermochromic microcapsule pigment of 10 μm in average particle diameter which was obtained by encapsulizing (enclosing in microcapsules) a reversibly thermochromic composition made up of a mutual solution of 3 parts of 3-dibutylamino-6-methyl-7-anilinofluoran, 6 parts of 4,4'-(2-methyl-propylidene)bisphenol and 25 parts each of cetyl alcohol and stearyl laurate, by epoxy resin/amine curing agent interfacial polymerization. Further, the foamed substrate 2 with these layers was coated on the back surface thereof with an adhesive 5, which was then laminated by folding it in such a way that the patterns 31a and 31b "elephant" and "giraffe", respectively, which had been provided side by side came top and bottom opposite, followed by cutting in a size of 140 mm in length and 140 mm in width. Thus, a reversibly thermochromic toy 1 was obtained.

In the above reversibly thermochromic toy 1, on both the top surface and back surface thereof, black circular solid patterns of the reversibly thermochromic layers 41a and 41b were each viewable on the white and green background at room temperature. Upon heating to 38° C. or more with hot water or the like, the black circular solid patterns came color-extinguished to turn colorless, so that the images of "elephant" and "giraffe" in the resin layers 3 came viewable. The reversibly thermochromic layers 41a and 41b further came to again color as its temperature came to be 35° C. or less upon leaving at room temperature or upon cooling, so that the black circular solid patterns came viewable and the above images were hidden. These phase changes were repeatedly performable.

The reversibly thermochromic toy 1 was also free of any warpage or deformation of the foamed substrate 2, was rich in flexibility, and maintained the hand and feel peculiar to the foamed substrate, because the reversibly thermochromatic toy 1 is provided on both the outer surfaces of the foamed substrates 2, 2 with the resin layers 3 by transfer processing.

Figure 6:
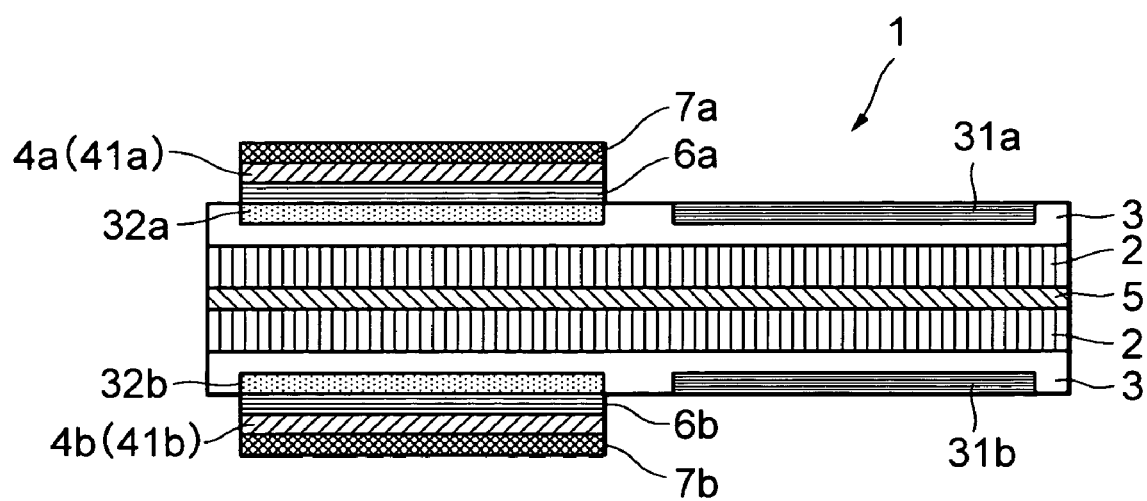
FIG. 6 is a cross-sectional view in a still further example of the reversibly metachromatic toy of the present invention.

Example 6 (See FIG. 6)

In addition to the construction of Example 5, under coat layers 6a and 6b each formed of a transparent urethane resin were provided between the resin layers 3 and the reversibly thermochromic layers 41a and 41b, as the reversibly metachromatic layers 4a and 4b, respectively, and top coat layers 7a and 7b each containing a transparent urethane resin and an ultraviolet absorber were further provided as upper layers of the reversibly thermochromic layers 41a and 41b, both by screen printing.

The above reversibly thermochromic toy 1 showed the same color changes as those in Example 5. It was free of any warpage or deformation of the foamed substrate 2, was rich in flexibility, and maintained the hand and feel peculiar to the foamed substrate, because the resin layers 3 were provided on the respective outer surfaces of the foamed substrates 2, 2 by transfer processing. At the same time, its adherence between the reversibly thermochromic layers 41a and 41b and the resin layers 3 was improved because the under coat layers 6a and 6b were provided as lower layers of the reversibly thermochromic layers 41a and 41b.

In addition, its scratch resistance and light-fastness were improved because the top coat layers 7a and 7b were provided as upper layers of the reversibly thermochromic layers 41a and 41b.

Figure 7:
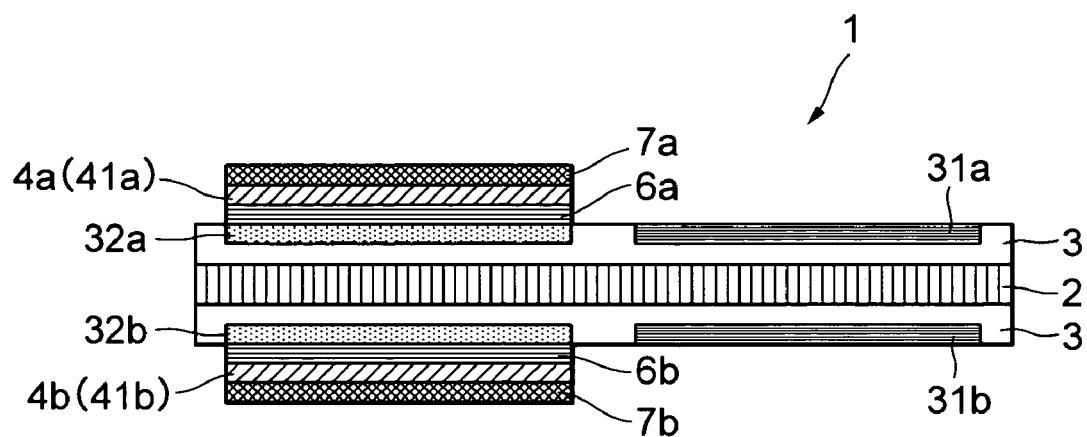
FIG. 7 is a cross-sectional view in a still further example of the reversibly metachromatic toy of the present invention.

Example 7 (See FIG. 7)

In addition to the construction of Example 5, under coat layers 6a and 6b each formed of a transparent urethane resin were provided between the resin layers 3 and the reversibly thermochromic layers 41a and 41b, as the reversibly metachromatic layers 4a and 4b, respectively, and top coat layers 7a and 7b each formed of a transparent urethane resin, an ultraviolet absorber and a gold metalescent pigment (trade name: LUMINAGOLD, available from Engelhard Asia Pacific Ink) were further provided as upper layers of the reversibly thermochromic layers 41a and 41b, both by screen printing.

In the above reversibly thermochromic toy 1, on both the top surface and back surface thereof, gold circular solid patterns were each viewable on the white and green background at room temperature. Upon heating to 38° C. or more with hot water or the like, circular solid patterns of the black reversibly thermochromic layers 41a and 41b came color-extinguished to turn colorless, so that the images of "elephant" and "giraffe" in the resin layers 3 came viewable. The reversibly thermochromic layers 41a and 41b further came to again color as its temperature came to be 35° C. or less upon leaving at room temperature or upon cooling, so that the gold circular solid patterns came viewable and the images in the resin layers 3 were hidden. These phase changes were repeatedly performable.

The above reversibly thermochromic toy 1 was also free of any warpage or deformation of the foamed substrate 2, was rich in flexibility, and maintained the hand and feel peculiar to the foamed substrate, because the reversibly thremochromic toy 1 was provided on both the surfaces of the foamed substrate 2 with the resin layers 3, 3 by transfer processing. At the same time, its adherence between the reversibly thermochromic layers 41a and 41b and the resin layers 3 was improved because the under coat layers 6a and 6b were provided as lower layers of the reversibly thermochromic layers 41a and 41b.

In addition, its scratch resistance and light-fastness were improved and at the same time the hiding performance to the resin layers 3 was improved, because the top coat layers 7a and 7b were provided as upper layers of the reversibly thermochromic layers 41a and 41b.

Figure 8:
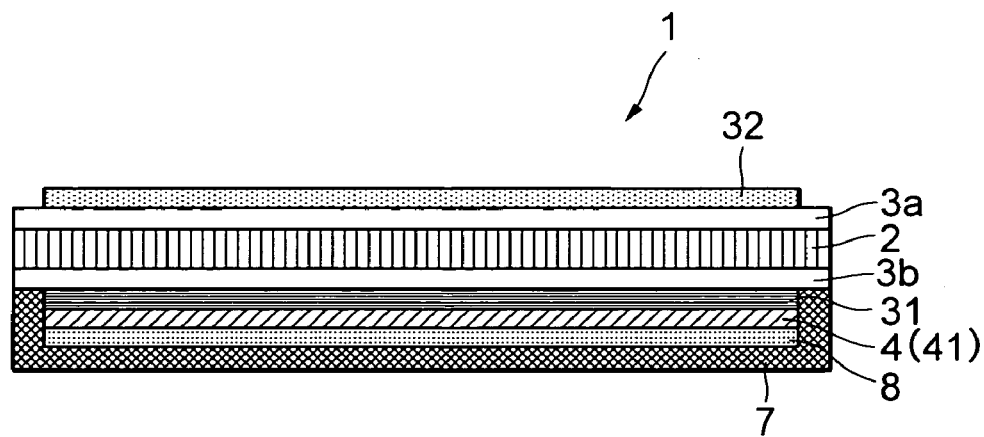
FIG. 8 is a cross-sectional view in a still further example of the reversibly metachromatic toy of the present invention.

Example 8 (See FIG. 8)

A 200 mm long, 250 mm wide and 10 mm thick platelike foamed substrate 2 made of a polyurethane resin was coated on both top and back surfaces thereof with an acrylic resin to provide resin layers 3a and 3b. On the resin layer 3a on the top surface of the foamed substrate 2, letters 32 of "dinosaur" were provided by screen printing using a non-metachromatic ink. On the resin layer 3b on the back surface of the foamed substrate 2, a figure or pattern 31 of a dinosaur was further provided by screen printing using a non-metachromatic ink. Thereafter, as a reversibly metachromatic layer 4, a reversibly thermochromic layer 41 was superposed thereon by forming an egg pattern on the pattern 31 by screen printing using a reversibly thermochromic ink prepared by dispersing in a vinyl chloride-vinyl acetate copolymer resin a reversibly thermochromic microcapsule pigment of 10 μm in average particle diameter which was obtained by encapsulizing (enclosing in microcapsules) a reversibly thermochromic composition made up of a mutual solution of 3 parts of 3-dibutylamino-6-methyl-7-anilinofluoran, 6 parts of 4,4'-(2-methyl-propylidene)bisphenol and 25 parts each of cetyl alcohol and stearyl caprate, by epoxy resin/amine curing agent interfacial polymerization. Then, on the reversibly thermochromic layer 41, a luster layer 8 formed of a vinyl chloride-vinyl acetate copolymer resin and containing a blue metalescent pigment (trade name: LUMINARED BLUE, available from Engelhard Asia Pacific Ink) was provided by screen printing. Further, on the layers superposingly provided on the back surface, a top coat layer 7 formed of a transparent vinyl chloride-vinyl acetate copolymer resin was provided. Thus, a reversibly thermochromic toy 1 was obtained.

In the above reversibly thermochromic toy 1, a metallic-blue egg pattern was viewable on the back surface at room temperature. Upon heating to 30° C. or more with the body heat or the like, the egg pattern, a black reversibly thermochromic image, came color-extinguished to turn colorless, so that a non-metachromatic image of the dinosaur came viewable. The reversibly thermochromic layer 41 further came to again color as its temperature came to be 28° C. or less upon leaving at room temperature or upon cooling, so that the metallic-blue egg pattern came viewable and the above non-metachromatic image was hidden. These phase changes were repeatedly performable.

The reversibly thermochromic toy 1 was also free of any warpage or deformation of the foamed substrate 2, was rich in flexibility, and maintained the hand and feel peculiar to the foamed substrate, because the foamed substrate 2 was provided with resin coatings on both the top surface and back surface of the foamed substrate 2. At the same time, the providing of the luster layer 8 enabled impartment of lustrousness, and also brought an improvement in hiding performance.

Figure 9:
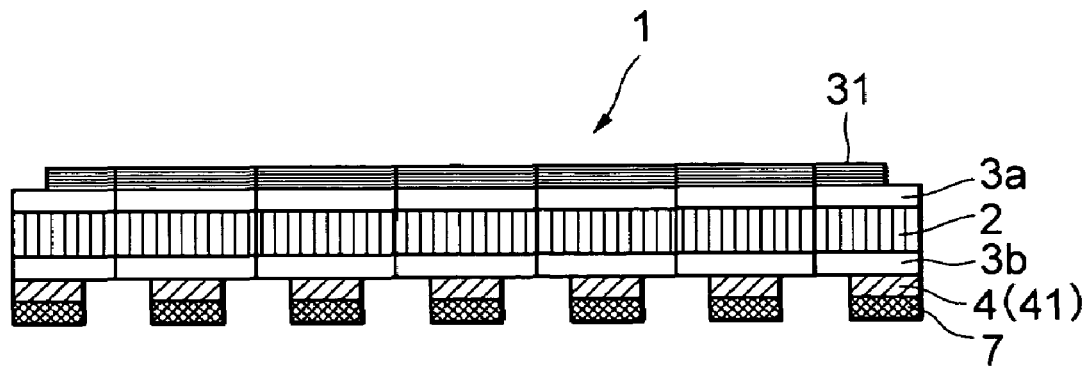
FIG. 9 is a cross-sectional view in a still further example of the reversibly metachromatic toy of the present invention.

Example 9 (See FIG. 9)

A 300 mm long, 450 mm wide and 15 mm thick platelike foamed substrate 2 made of a polyethylene resin was coated on the top surface thereof with a transparent urethane resin to provide a resin layer 3a. Thereafter, on the transparent urethane resin layer 3a on the top surface of the foamed substrate 2, a figure or pattern of "landscape" (pattern 31) was provided using non-metachromatic blue, pink, yellow and black inks each. Next, on the back surface of the foamed substrate 2, a non-metachromatic white ink containing a urethane resin was printed to provide a resin layer 3b. Further, on the resin layer 3b thus formed, as a reversibly metachromatic layer 4, a reversibly thermochromic layer 41 was formed by superposing numerals of "1" to "30" by screen printing using a reversibly thermochromic ink prepared by dispersing in a transparent urethane resin a reversibly thermochromic microcapsule pigment of 10 μm in average particle diameter which was obtained by encapsulizing (enclosing in microcapsules) a reversibly thermochromic composition made up of a mutual solution of 3 parts of 2-anilino-3-methyl-6-dibutylaminofluoran, 6 parts of 4,4'-(2-methyl-propylidene)bisphenol and 50 parts of neopentyl stearate, by epoxy resin/amine curing agent interfacial polymerization. Thereafter, as an upper layer on the reversibly thermochromic numerals (reversibly thermochromic layer 41), a top coat layer 7 formed of a transparent urethane resin was provided, which was then worked by punching in such a way that any one of the numerals was held in one piece. Thus, a reversibly thermochromic toy 1 was obtained which was in the form of a 30-piece puzzle piece.

On the top surface of the reversibly thermochromic toy 1, the non-metachromatic figure or pattern 31 "landscape" was viewable. Also, on the back surface of the reversibly thermochromic toy 1, black numerals were viewable at room temperature, which functioned as numerals for reference in assembling a puzzle. The back surface of the reversibly thermochromic toy 1 in the form of a puzzle piece came color-extinguished upon heating to 32° C. or more to turn colorless, and maintained this condition even when it was returned to room temperature. Further, upon cooling of the puzzle piece to 15° C. or less, the black numerals appeared again, and this colored condition was maintained also in the state of room temperature, enabling arbitrary regulation of the degree of difficulty of the puzzle. These phase changes were repeatedly performable.

The reversibly thermochromic toy 1 was also free of any warpage or deformation of the foamed substrate 2, was rich in flexibility, and maintained the hand and feel peculiar to the foamed substrate, because the resin layers 3a and 3b were provided on both the top surface and back surface, respectively, of the foamed substrate 2 by coating.

Example 10 (See FIG. 10)

Setting two sheets as pages 1 to 4 of the reversibly thermochromic toy set 11 obtained in the form of a picture book in Example 4, and also one sheet as pages 5 and 6 of the reversibly thermochromic toy 1 obtained in Example 1, and one sheet as pages 7 and 8 of the reversibly thermochromic toy 1 obtained in Example 5, one hole 10 was made through these four sheets of reversibly thermochromic toy and toy set at their left side upper end portions. These toy sheets were put together with a ring fastener 9 made of a polypropylene resin, to make up a reversibly thermochromic toy set 11 in the form of a picture book, which was put into practical use.

The above reversibly thermochromic toy set 11 in the form of a picture book showed on pages 1 to 4 the same color changes as those in Example 4, on pages 5 and 6 the same color changes as those in Example 1, and on pages 7 and 8 the same color changes as those in Example 5. These phase changes were repeatedly performable.

The reversibly thermochromic toy set 11 in the form of a picture book was free of any warpage or deformation of the foamed substrate 2, was rich in flexibility, and maintained the hand and feel peculiar to the foamed substrate, because the resin layers 3a and 3b were provided on both the top surfaces and back surfaces, or the top surface, of the foamed substrates 2 by transfer processing and screen printing. Also, by means of the ring fastener 9, the plural reversibly thermochromic toys 1 were holdable, promising a high fun or enjoyment as toys, and also can be kept back compactly without bulking, affording a high commercial value.

Figure 11:
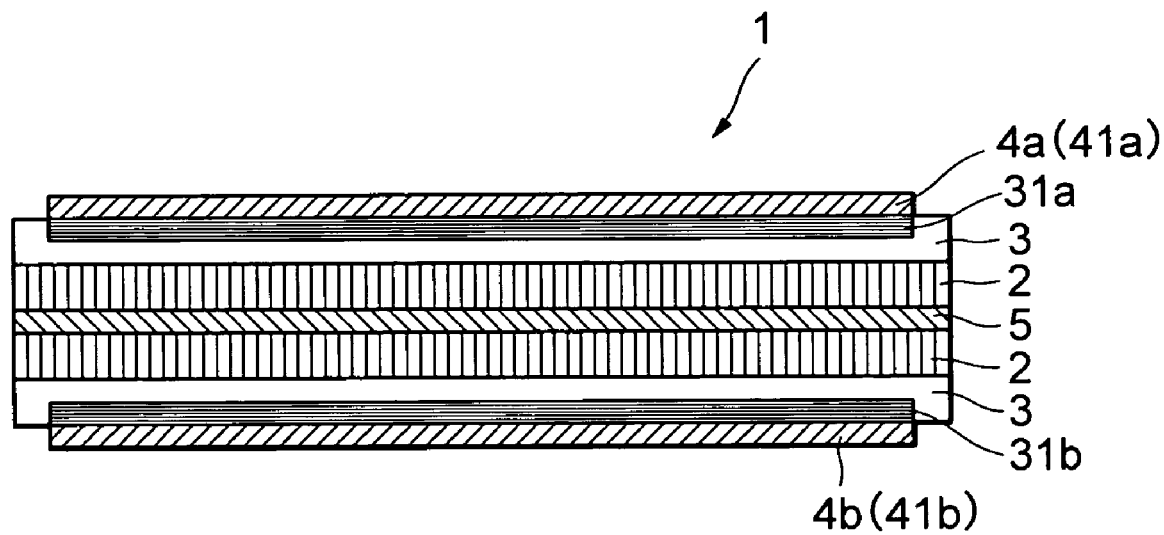
FIG. 11 is a cross-sectional view in a still further example of the reversibly metachromatic toy of the present invention.

Example 11 (See FIG. 11)

On a transfer film made of a polyester resin, a photographic split pictures or patterns 31a of "robot" and a photographic split pictures or patterns 31b of "monster" were side by side provided by gravure printing using a non-metachromatic ink, and a background-making polyurethane resin-containing non-metachromatic white ink was superposed on the respective pictures or patterns by screen printing to obtain a film with pictures or patterns for transfer.

Next, on the top surface of a 160 mm long, 330 mm wide and 3 mm thick platelike foamed substrate 2 made of an ethylene-vinyl acetate copolymer resin a hot melt type adhesive was coated, followed by drying. Thereafter, the film with pictures or patterns for transfer was laid on the foamed substrate to put them together, which were then contact-bonded by means of a heat roll. After cooling, the polyester resin film was peeled to effect transfer to provide a resin layer 3. Then, as reversibly metachromatic layers 4a and 4b, reversibly thermochromic layers 41a and 41b were formed by superposing elliptic solid pattern on the pictures or patterns 31a and 31b of "robot" and "monster", respectively, by screen printing using the same reversibly thermochromic ink as that of Example 5. Further, the foamed substrate 2 with these layers was coated on the back surface thereof with an adhesive 56, and thereafter laminated by folding it in such a way that the patterns 31a and 31b "robot" and "monster", respectively, which had been provided side by side came top and bottom opposite, followed by cutting in a size of 140 mm in length and 140 mm in width. Thus, a reversibly thermochromic toy 1 shown in FIG. 11 was obtained.

In the above reversibly thermochromic toy 1 shown in FIG. 11, on both the top surface and back surface thereof, black elliptic solid patterns of the reversibly thermochromic layers 41a and 41b were each viewable on the white backgrounds at room temperature. Upon heating to 38° C. or more with hot water or the like, the black elliptic solid patterns came color-extinguished to turn colorless, so that elaborate photographic split images of "robot" and "monster" came viewable. The reversibly thermochromic layers 41a and 41b further came to again color as its temperature came to be 35° C. or less upon leaving at room temperature or upon cooling, so that the black elliptic solid patterns came viewable and the above images were hidden. These phase changes were repeatedly performable.

The reversibly thermochromic toy 1 was also free of any warpage or deformation of the foamed substrate 2, was rich in flexibility, and maintained the hand and feel peculiar to the foamed substrate, because the reversibly thermochromic toy 1 was provided on both the outer surfaces of the foamed substrates 2, 2 with the resin layer 31a, 31b by transfer processing.

In addition, beautiful and elaborate photographic split pictures or patterns were obtained to enable enahancement of added value as toys, because the resin layers 31a, 31b were formed with printed images by transfer of non-metachromatic patterns.

Figure 12:
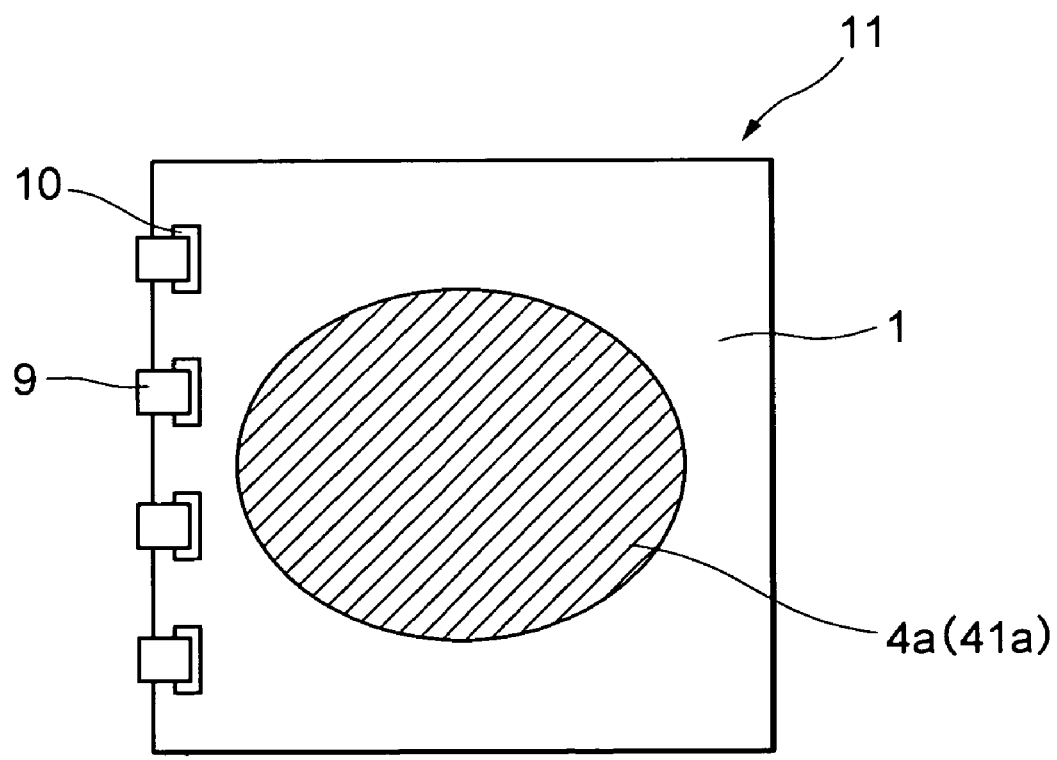
FIG. 12 is a top plan view of the reversibly metachromatic toy of the present invention in the form of a booklet.

Example 12 (See FIG. 12)

Three reversibly thermochromic toys 1 were obtained with the similar construction as that of Example 11 except that photographic split pictures or patterns 31a, 31b were changed to "flower" and "insect", "coral reef" and "tropical fish", and "constellation" and "moon".

Setting as pages 1 to 6 the three reversibly thermochromic toys 1 thus obtained and as pages 7 and 8 the reversibly thermochromic toy 1 obtained in Example 11, four holes 10 were made in these four reversibly thermochromic toys 1 through portions vicinal to their left sides and at regular intervals. These toys were put or bound together with fasteners 9 made of a metal, to make up a reversibly thermochromic toy set 11 in the form of a picture book, which was put into practical use.

In the above reversibly thermochromic toy set 11 in the form of a picture book, on both the top surface and back surface of each reversibly thermochromic toy 1, black elliptic solid pattern of the reversibly thermochromic layer 41a, 41b was viewable on the white background at room temperature with respect to all the pages. Upon heating to 38° C. or more with hot water or the like, the black elliptic solid pattern of each reversibly thermochromic toy came color-extinguished to turn colorless, so that elaborate photographic split images of "flower" and "insect", "coral reef" and "tropical fish", "constellation" and "moon", and "robot" and "monster" came viewable. The reversibly thermochromic layers 41a, 41b further came to again color as their temperature came to be 35° C. or less upon leaving at room temperature or upon cooling, so that the black elliptic solid patterns came viewable and the above images were hidden. These phase changes were repeatedly performable.

The reversibly thermochromic toy set 11 in the form of a picture book was free of any warpage or deformation of the foamed substrate 2, was rich in flexibility, and maintained the hand and feel peculiar to the foamed substrate, because the resin layers 31a, 31b were provided on both the outer surfaces of the foamed substrates 2, 2 by transfer processing. Also, by means of the binding fasteners 9, a plurality of reversibly thermochromic toys 1 were holdable, promising a high fun or enjoyment as toys. At the same time, they were able to be kept back compactly also in a closed state. In addition, elaborate photographic split pictures or patterns enhanced added value as toys, because the non-metachromatic patterns 31a and 31b on the resin layers 3, 3 were formed by transfer processing.

Figure 13:
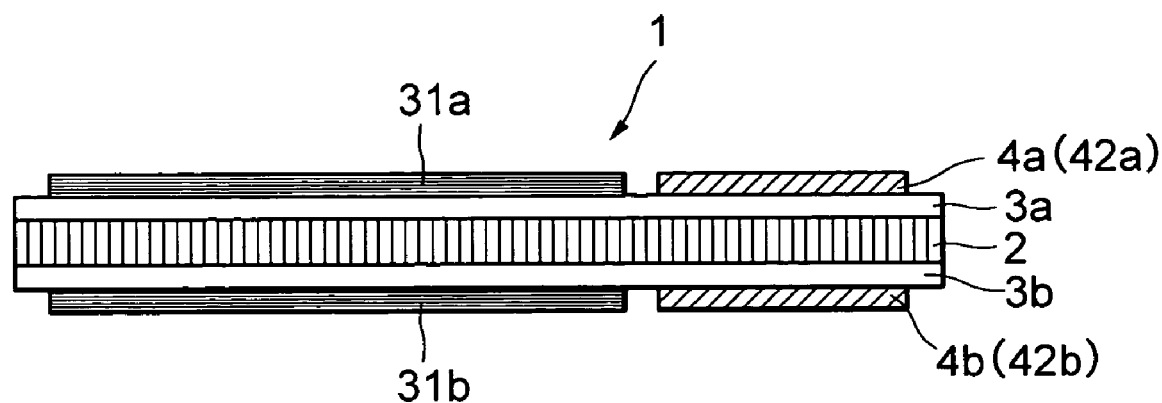
FIG. 13 is a cross-sectional view in a still further example of the reversibly metachromatic toy of the present invention.

Example 13 (See FIG. 13)

On both surfaces of a 140 mm long, 140 mm wide and 6 mm thick platelike foamed substrate 2 made of an ethylene-vinyl acetate copolymer resin, solid patterns were formed all over the surfaces by screen printing using a non-metachromatic white ink containing a transparent acrylate resin, to form resin layers 3a and 3b. Thereafter, on the white-ink resin layers 3a and 3b, figures or patterns 31a and 31b of "mouse" and "zebra", respectively, were provided by screen printing using a non-metachromatic ink.

On the laterals of the patterns 31a and 31b, letters of "mouse" and "zebra", respectively, forming reversibly photochromic layers 42a and 42b as reversibly metachromatic layers 4a and 4b were provided by screen printing using a reversibly photochromic ink obtained by mixing and uniformly stirring 2 parts of an organic photochromic compound (trade name: YELLOW #4, available from Kiroku Sozai Sogo Kenkyusho), 8 parts of a light stabilizer, 50 parts of an acrylic polyol resin xylene solution (solid content: 50%; light transmittance: 95%), 50 parts of xylene and 10 parts of a curing agent. Thus, a reversibly photochromic toy 1 was obtained.

In the above reversibly photochromic toy 1, the non-metachromatic patterns 31a and 31b "mouse" and "zebra" provided on the resin layers 3a and 3b, respectively, were viewable when not irradiated by light. When irradiated by light by sunlight or the like, yellow letters of "mouse" and "zebra" were viewable on the laterals of the patterns 31a and 31b, respectively. This phase change was repeatedly performable by irradiation and unirradiation by light.

The reversibly photochromic toy 1 was also free of any warpage or deformation of the foamed substrate 2, was rich in flexibility, and maintained the hand and feel peculiar to the foamed substrate, because the resin layers 3a and 3b were directly provided on both the top surface and back surface of the foamed substrate 2 by screen printing.

Figure 14:
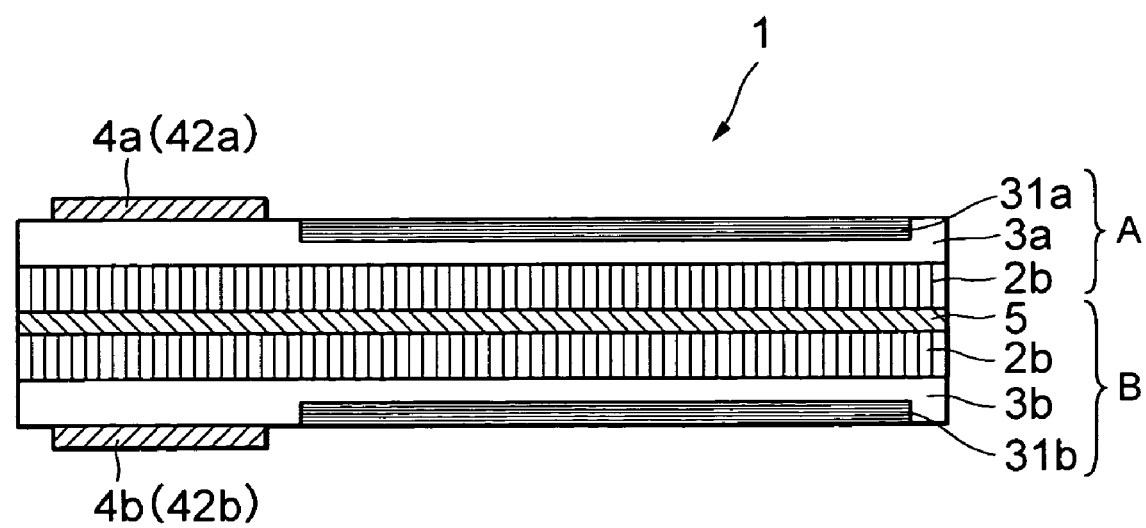
FIG. 14 is a cross-sectional view in a still further example of the reversibly metachromatic toy of the present invention.

Example 14 (See FIG. 14)

Onto the top surface of a 140 mm long, 140 mm wide and 3 mm thick platelike foamed substrate 2a made of an ethylene-vinyl acetate copolymer resin, a resin layer 3a which comprises a background-making white layer formed with a figure or pattern 31a of "duck" by the use of a polyurethane resin-containing non-metachromatic ink was thermally transferred from a transfer sheet. Thereafter, on the lateral of the pattern 31a of "duck", as a reversibly metachromatic layer 4a, a reversibly photochromic layer 42a was provided by forming letters of "duck" by screen printing using a reversibly photochromic ink obtained by mixing and uniformly stirring 2 parts of an organic photochromic compound (trade name: PHOTOROME 14, available from Nippon Kemikkusu Y.K.), 8 parts of a light stabilizer, 50 parts of an acrylic polyol resin xylene solution (solid content: 50%; light transmittance: 95%), 50 parts of xylene and 10 parts of a curing agent. Thus, a reversibly photochromic foamed substrate structure A was obtained.

Next, onto the top surface of a likewise 140 mm long, 140 mm wide and 3 mm thick platelike foamed substrate 2b made of an ethylene-vinyl acetate copolymer resin, a resin layer 3b which comprises a background-making green layer formed with a pattern 31b of "raccoon dog" by the use of a polyurethane resin-containing non-metachromatic ink, was thermally transferred from a transfer sheet. Thereafter, on the lateral of the pattern 31b of "raccoon dog", as a reversibly metachromatic layer 4b a reversibly photochromic layer 42b was provided by forming letters of "raccoon dog" by screen printing using the same reversibly photochromic ink as the above. Thus, a reversibly photochromic foamed substrate structure B was obtained.

Further, the reversibly photochromic foamed substrate structure A was coated on the back surface thereof with an adhesive 5, which was then laminated to the back surface of the reversibly photochromic foamed substrate structure B to obtain a reversibly photochromic toy 1.

In the above reversibly photochromic toy 1, on the substrate structure A side, the non-metachromatic figure or pattern 31a "duck" provided in the resin layer 3a and, on the substrate structure B side, the non-metachromatic figure or pattern 31b "raccoon dog" provided in the resin layer 3b were each viewable when not irradiated by light. When irradiated by light by sunlight or the like, the reversibly photochromic layer 42a and 42b colored, so that, on the substrate structure A side, blue letters of "duck" and, on the substrate structure B side, blue letters of "raccoon dog" each came viewable. The blue letters formed by reversibly photochromic layer 42a and 42b further came color-extinguished when the irradiation by light was stopped. This phase change was repeatedly performable.

The reversibly photochromic toy 1 was also free of any warpage or deformation of the foamed substrate, was rich in flexibility, and maintained the hand and feel peculiar to the foamed substrate, because the resin layers 3a and 3b were provided on both the outer surfaces of the foamed substrate 2a, 2b by transfer processing.

Figure 15:
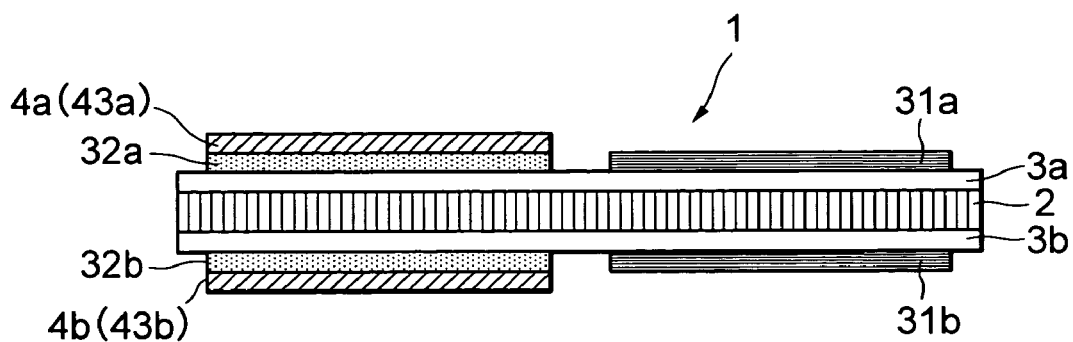
FIG. 15 is a cross-sectional view in a still further example of the reversibly metachromatic toy of the present invention.

Example 15 (See FIG. 15)

On both sides of a 140 mm long, 140 mm wide and 6 mm thick platelike foamed substrate made of an ethylene-vinyl acetate copolymer resin, solid patterns were formed all over the surfaces by screen printing using a non-metachromatic white ink containing a transparent synthetic rubber latex, to form resin layers 3a and 3b. Thereafter, on the white-ink resin layers 3a and 3b, letters 32a and 32b of "mouse" and "zebra", respectively, and their figures or patterns 31a and 31b were each provided by screen printing using a non-metachromatic ink.

Next, on the letters 32a and 32b of "mouse" and "zebra", respectively, as reversibly metachromatic layers 4a and 4b, reversibly water-metachromatic layers 43a and 43b were provided by forming circular solid patterns by screen printing using a yellow reversibly water-metachromatic ink prepared by uniformly mixing and stirring 15 parts of wet-process fine-powdery silica (trade name: NIPSIL E-220; available from Nippon Silica Industrial Co., Ltd.), 0.5 part of a yellow pigment (trade name: NL Yellow HL-N, available from Dainichi Chemical Industry Co., Ltd.), 45 parts of a urethane emulsion (trade name: HYDRAN AP-10; available from Dainippon Ink & Chemicals, Incorporated; solid content: 30%), 40 parts of water, 0.5 part of a silicone type anti-foaming agent, 3 parts of a water-based ink thickening agent, 1 part of ethylene glycol and 3 parts of a blocked-isocyanate type cross-linking agent. Thus, a reversibly water-metachromatic toy 1 was obtained.

In the above reversibly water-metachromatic toy 1, the non-metachromatic figures or patterns 31a and 31b "mouse" and "zebra" provided on the resin layers 3a and 3b, respectively, and yellow circular solid patterns of the reversibly water-metachromatic layers 43a and 43b were each viewable in a dry condition. Upon applying a liquid such as water thereto, the yellow circular solid patterns came color-extinguished to turn colorless, so that the letters 32a and 32b of "mouse" and "zebra" on the resin layers 3a and 3b came viewable. The reversibly water-metachromatic layers 43a and 43b further came to again color as the liquid evaporates, so that the circular solid patterns came viewable and the letters 32a and 32b were hidden. These phase changes were repeatedly performable.

The reversibly water-metachromatic toy 1 was also free of any warpage or deformation of the foamed substrate 2, was rich in flexibility, and maintained the hand and feel peculiar to the foamed substrate, because the resin layers 3a and 3b were directly provided on both the top surface and back surface, respectively, of the foamed substrate 2 by screen printing.

Figure 16:
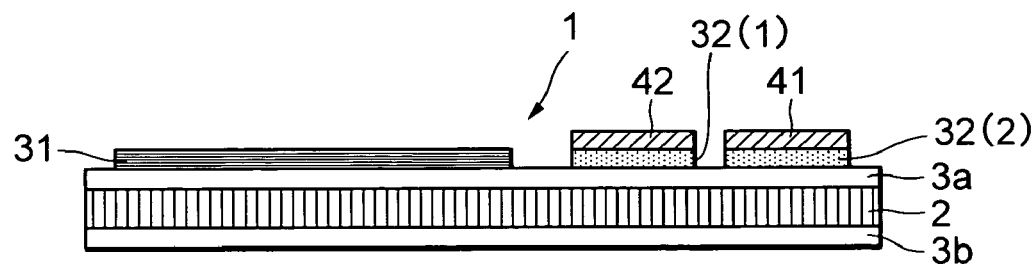
FIG. 16 is a cross-sectional view in a still further example of the reversibly metachromatic toy of the present invention.

Example 16 (See FIG. 16)

A 140 mm long, 140 mm wide and 6 mm thick platelike foamed substrate 2 made of an ethylene-vinyl acetate copolymer resin was coated on the back surface thereof with a transparent chlorinated polypropylene resin all over the surface to form a resin layer 3b. On the top surface of this foamed substrate, a solid pattern was further formed all over the surface by screen printing using a non-metachromatic white ink containing the transparent chlorinated polypropylene resin, to form a resin layer 3a. Next, on the white-ink resin layer 3a, a figure or pattern 31 of "mouse" and letters 32(1) and 32(2) of "dark" and "warm", respectively, were each provided by screen printing using a non-metachromatic ink.

On the letters 32(2) of "warm", an elliptic solid pattern with open faces of letters "cold" (reversibly thermochromic layer 41) was further provided by the use of the same reversibly thermochromic ink as that of Example 5 and, on the letters 32(1) of "dark", an elliptic solid pattern with exposed letters, that is, with open faces of letters "bright" (reversibly photochromic layer 42) was provided by the use of the same reversibly photochromic ink as that of Example 14, both by screen printing. Thus, a reversibly metachromatic toy 1 was obtained.

In the above reversibly metachromatic toy 1, the non-metachromatic pattern 31 "mouse", the letters 32(1) of "dark", and black open-faced letters "cold" of the reversibly thermochromic layer 41 were viewable when irradiated by light at room temperature. Upon heating to 38° C. or more with hot water or the like, the black open-faced letters "cold" of the reversibly thermochromic layer 41 came color-extinguished to turn colorless, so that the letters 32(2) of "warm" came viewable.

When irradiated by light by sunlight or the like, the reversibly photochromic ink also colored, so that blue open-faced letters "bright" of the reversibly photochromic layer 42 came viewable and the letters 32(1) of "dark" were hidden.

Upon leaving of the reversibly metachromatic toy 1 in a dark place at room temperature, the black open faces letters "cold" and the letters "dark" further came again viewable.

These phase changes were repeatedly performable.

The reversibly metachromatic toy 1 was free of any warpage or deformation of the foamed substrate 2, was rich in flexibility, and maintained the hand and feel peculiar to the foamed substrate, because the resin layers 3a and 3b were provided on both the top surface and back surface, respectively, of the foamed substrate 2 by coating and screen printing.

The providing of the reversibly thermochromic layer 41 and the reversibly photochromic layer 42 side by side also enabled use of various metachromatic means and enabled enhancement of commercial value.

Figure 17:
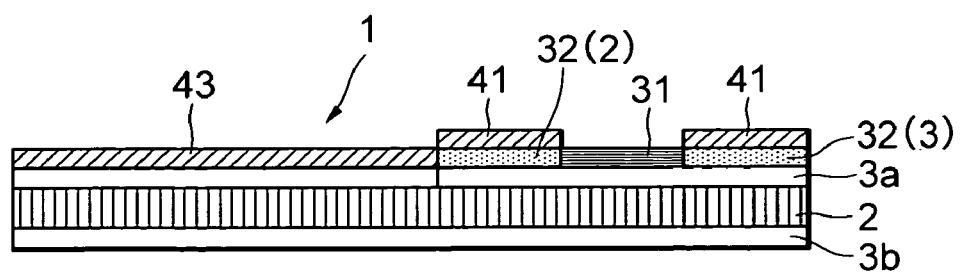
FIG. 17 is a cross-sectional view in a still further example of the reversibly metachromatic toy of the present invention.

Example 17 (See FIG. 17)

A 140 mm long, 140 mm wide and 6 mm thick platelike foamed substrate 2 made of an ethylene-vinyl acetate copolymer resin was coated on the back surface thereof with a transparent chlorinated polypropylene resin all over the surface to form a resin layer 3b. On the top surface of this foamed substrate, white and pink solid patterns were further formed half by half by screen printing using non-metachromatic white and pink inks containing the transparent chlorinated polypropylene resin, to form a resin layer 3a.

Next, a white solid pattern forming reversibly water-metachromatic layer 43 was so provided as to cover the pink-ink resin layer 3a, by screen printing using the same reversibly water-metachromatic ink as that of Example 15. Further, on the white-ink resin layer 3a, a figure or pattern 31 of "rabbit" and, on its upper part, left part, right part and lower part as viewed in a plan view (not shown), letters 32(1) to 32(4) of "try writing letters", "hiragana" (Japanese letters), "katakana" (Japanese letters) and "ABC", respectively, were provided using a non-metachromatic ink each, and also, on the letters 32(2) to 32(4) of "hiragana", "katakana" and "ABC", elliptic solid patterns with open faces of marks "?" forming reversibly thermochromic layers 41, were provided using the same reversibly thermochromic ink as that of Example 8, all by screen printing (letters 32(1) and 32(4) not shown). Thus, a reversibly metachromatic toy 1 was obtained.

In the above reversibly metachromatic toy 1, the non-metachromatic pattern 31 "rabbit", the letters 32(1) of "try writing letters", three black open faces marks "?" and white solid patterns were viewable at room temperature. Upon heating of the black open faces marks "?" which are the reversibly thermochromic patterns 41, to 30° C. or more with a hand or the like, they came color-extinguished to turn colorless, so that the respective letters 32(2) to 32(4) came viewable.

Upon adhesion of a liquid such as water to the white solid pattern, the reversibly water-metachromatic layer 43, it turned pink at that part.

Upon leaving of the reversibly metachromatic toy 1 at room temperature to allow the liquid to evaporate and come 28° C. or less, the white solid pattern and the three black open faces marks "?" came again viewable.

These phase changes were repeatedly performable.

The reversibly metachromatic toy 1 was free of any warpage or deformation of the foamed substrate 2, was rich in flexibility, and maintained the hand and feel peculiar to the foamed substrate, because the resin layers 3a and 3b were provided on both the top surface and back surface, respectively, of the foamed substrate 2 by coating and screen printing.

In addition, in the reversibly metachromatic toy 1, any one of the black open faces marks "?" which are the reversibly thermochromic patterns 41, may be made to come color-extinguished so that any of the subjects "hiragana", "katakana" and "ABC" may be selected, in accordance with which infants can write corresponding letters on the white solid pattern, the reversibly water-metachromatic layer 43, with brushes or the like having been soaked with water. This enables the toy to be used as an intellectual training toy and can enhance commercial value.

Comparative Example 1

A reversibly thermochromic toy was produced with the same construction as that of Example 1 except that a resin layer 3 was provided only on one surface of the foamed substrate 2.

The reversibly thermochromic toy showed the same metachromatism as that of Example 1. However, since the resin layer 3 was provided only on one surface of the foamed substrate 2, the toy caused warpage of the foamed substrate 2 to spoil the beauty of the toy to lower its commercial value greatly.

Comparative Example 2

A reversibly thermochromic toy set in the form of a picture book was produced with the same construction as that of Example 4 except that a resin layer 3 was provided only on one surface (pages 1 and 3) of each foamed substrates 2.

The reversibly thermochromic toy set 1 in the form of a picture book showed the same metachromatism as that of Example 4. However, since the resin layers 3 were provided only on one surfaces of the foamed substrates 2, warpage of each foamed substrates 2 was caused, and the picture book kept back wrongly in the state it was closed, and also to spoil the beauty of the toy to lower its commercial value greatly.

What is claimed is:

1. A reversibly metachromatic toy comprising a plurality of laminates, each laminate comprising:
   a foamed resin substrate, said substrate having been expanded from 5 to 40 times and being formed as a plate defining front and back sides,
   first and second resin layers respectively covering said front and back sides of the foamed substrate and being affixed thereto,
   a reversibly metachromatic layer provided on at least a portion of one of said first or second resin layers,
   wherein each laminate is formed with at least one hole, said laminates being joined together with a fastener through the holes.

2. A reversibly metachromatic toy according to claim 1, wherein reversibly metachromatic layers are provided on at least a portion of both said first and second resin layers.

3. A reversibly metachromatic toy according to claim 1, wherein said reversibly metachromatic layer comprises at least two of group consisting of a thermochromic layer, a photochromic layer, or a water-metachromatic layer.

4. A reversibly metachromatic toy according to claim 3, wherein said resin layer is provided by printing or coating a resin, by printing or coating an ink containing a resin, by adhering a resin film, or by transferring a resin layer from a transfer sheet or film.

5. A reversibly metachromatic toy according to claim 1, wherein said first and second resin layers are provided over at least 50% of said front and back sides of said foamed substrate.

6. A reversibly metachromatic toy according to any of claims 1–5, wherein said first and second resin layers are provided at mutually opposite positions on said front and back sides of said foamed substrate.

7. A reversibly metachromatic toy according to claim 1, wherein said reversibly metachromatic layer comprises at least one of the group consisting of a thermochromic layer, a photochromic layer, and a water-metachromatic layer.

* * * * *

UNITED STATES PATENT AND TRADEMARK OFFICE
CERTIFICATE OF CORRECTION

| | |
|---|---|
| PATENT NO. | : 7,189,133 B2 |
| APPLICATION NO. | : 10/790773 |
| DATED | : March 13, 2007 |
| INVENTOR(S) | : Hiroki Harata et al. |

It is certified that error appears in the above-identified patent and that said Letters Patent is hereby corrected as shown below:

ON THE TITLE PAGE [56] REFERENCES CITED:

Foreign Patent Documents,
"DE 299 06 251 1/1999" should read --DE 299 06 251 12/1999--; and
"06343094  Y2    should read --63-43094  Y2
 00424040  A"                              4-24040  A--.

COLUMN 2:

Line 4, "comprise" should read --comprising--.

COLUMN 3:

Line 2, "resin letters" should read --resin layer, or figures or patterns and characters or letters--.

COLUMN 5:

Line 12, "of" (first occurrence) should be deleted.

COLUMN 7:

Line 60, "viny" should read --vinyl--.

UNITED STATES PATENT AND TRADEMARK OFFICE
CERTIFICATE OF CORRECTION

| | |
|---|---|
| PATENT NO. | : 7,189,133 B2 |
| APPLICATION NO. | : 10/790773 |
| DATED | : March 13, 2007 |
| INVENTOR(S) | : Hiroki Harata et al. |

It is certified that error appears in the above-identified patent and that said Letters Patent is hereby corrected as shown below:

<u>COLUMN 22</u>:

Line 42, "surfaces" should read --surface--;
    Line 54, "thereto," should read --thereto, and--; and
    Line 66, "group" should read --a group--.

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,189,133 B2 |
| APPLICATION NO. | : 10/790773 |
| DATED | : March 13, 2007 |
| INVENTOR(S) | : Hiroki Harata et al. |

It is certified that error appears in the above-identified patent and that said Letters Patent is hereby corrected as shown below:

ON THE TITLE PAGE [56] REFERENCES CITED:

Foreign Patent Documents,
"DE 299 06 251 1/1999" should read --DE 299 06 251 12/1999--; and
"06343094 Y2" should read --63-43094 Y2
"00424040 A" should read -- 4-24040  A--.

COLUMN 2:

Line 4, "comprise" should read --comprising--.

COLUMN 3:

Line 2, "resin letters" should read --resin layer, or figures or patterns and characters or letters--.

COLUMN 5:

Line 12, "of" (first occurrence) should be deleted.

COLUMN 7:

Line 60, "viny" should read --vinyl--.

COLUMN 22:

Line 42, "surfaces" should read --surface--;
Line 54, "thereto," should read --thereto, and--; and

UNITED STATES PATENT AND TRADEMARK OFFICE
CERTIFICATE OF CORRECTION

PATENT NO. : 7,189,133 B2
APPLICATION NO. : 10/790773
DATED : March 13, 2007
INVENTOR(S) : Hiroki Harata et al.

It is certified that error appears in the above-identified patent and that said Letters Patent is hereby corrected as shown below:

Line 66, "group" should read --a group--.

Signed and Sealed this

Ninth Day of September, 2008

JON W. DUDAS
*Director of the United States Patent and Trademark Office*